US006789996B2

(12) United States Patent
Yuyama et al.

(10) Patent No.: US 6,789,996 B2
(45) Date of Patent: Sep. 14, 2004

(54) MEDICINE FEED APPARATUS

(75) Inventors: Shoji Yuyama, Toyonaka (JP); Hiroyuki Yuyama, Toyonaka (JP); Toshihiro Amatsu, Toyonaka (JP)

(73) Assignee: Yuyama Mfg. Co., Ltd., Osaka (JP)

(*) Notice: Subject to any disclaimer, the term of this patent is extended or adjusted under 35 U.S.C. 154(b) by 0 days.

(21) Appl. No.: 10/124,319

(22) Filed: Apr. 18, 2002

(65) Prior Publication Data

US 2002/0154987 A1 Oct. 24, 2002

(30) Foreign Application Priority Data

Apr. 19, 2001 (JP) ....................................... 2001-120995
Jun. 25, 2001 (JP) ....................................... 2001-191459

(51) Int. Cl.[7] ................................................ B65G 59/06

(52) U.S. Cl. .................... 414/798.1; 221/251; 221/254; 414/797.9

(58) Field of Search ................................ 221/221, 232, 221/251, 254, 298; 414/797.4, 797.5, 798, 798.1, 797.9

(56) References Cited

U.S. PATENT DOCUMENTS 3,970,216 A 7/1976 Rainey ........................ 221/125
4,542,834 A 9/1985 Kurosawa et al. .......... 221/116
4,544,315 A * 10/1985 Muskulus ................ 414/796.1
4,673,105 A 6/1987 Kurosawa et al. .......... 221/281
5,251,784 A 10/1993 Chacon Sevila et al. ... 221/220
5,755,551 A * 5/1998 Saeki et al. .............. 414/797.6
6,071,067 A * 6/2000 Boon et al. .............. 414/797.8
6,419,441 B1 * 7/2002 Ernst ........................ 414/797.9

FOREIGN PATENT DOCUMENTS

| | | |
|---|---|---|
| EP | 0 374 529 | 6/1990 |
| EP | 0 810 562 | 12/1997 |
| GB | 2 224 498 | 5/1990 |
| JP | 8-243146 | 9/1996 |
| JP | 8-244889 | 9/1996 |
| TW | 341954 | 10/1998 |
| WO | 00/34925 | 6/2000 |

* cited by examiner

*Primary Examiner*—Janice L. Krizek
(74) *Attorney, Agent, or Firm*—Wenderoth, Lind & Ponack, L.L.P.

(57) ABSTRACT

A support member (7) is positioned at a lower part of a storage container (3). The support member (7) supports a second medicine container (10, 16, 17) placed on the lowermost medicine container so that the lowermost medicine container falls off by its own weight. The discharge member (8) discharges the medicine container which fell off from the support member (7). The collecting mechanism (24) conveys the medicines containers discharged from the discharge member (8) to one position.

11 Claims, 10 Drawing Sheets

(a)

(b)

MEDICINE FEED APPARATUS

BACKGROUND OF THE INVENTION

The present invention relates to a medicine feed apparatus for automatically feeding peculiar medicines such as separately packed medicines, five-connected plastic ampoules, PTP-packed medicine and so on.

Conventionally, there has been known a medicine feed apparatus in which plural sets of five-connected plastic ampoules are supported in a stacked condition in a storage container and cut and discharged one by one by means of a conveyor belt positioned at lowermost portion and a rotor (refer to Japanese Patent Laid-open publications No. H8-243146, H8-244889 and so on).

However, in the above mentioned medicine feed apparatus, the ampoules that are cut and discharged but never dosed cannot be stored and fed again. It is a present situation that about 20% of the ampoules fed by the apparatus are recovered without being dosed. Therefore, it has been desired to provide a construction that can feed such recovered medicines again.

Recently, there has been sold separately packed or unit-packed medicines because of the labor savings of a medicine dispensing work. Thus, it has been also desired to provide a construction that can deal with such a kind of packed medicines.

SUMMARY OF THE INVENTION

The present invention has been developed to substantially eliminate the above-described disadvantages.

It is therefore an object of the present invention to provide a medicine feed apparatus having a construction that can feed any packed-types of medicines.

In order to attain the aforementioned objects, there is provided a medicine feed apparatus comprising a plurality of storage containers for storing medicines which are stacked in a vertical direction, the necessary quantity of medicines being discharged one by one in accordance with prescription data in order from the lowermost medicine. The apparatus comprises:

- a support member positioned at a lower part of the storage container, the support member supporting the second medicine placed on the lowermost medicine so that the lowermost medicine falls off by its own weight;
- a discharge member for discharging the medicine which fell from the support member; and
- a collecting mechanism for conveying the medicines discharged from the discharge member to one position.

According to the aforementioned construction of the present invention, driving the discharge member allows the necessary number of medicines to be discharged from the lowermost point to the collecting mechanism and collected to one position.

Preferably, the discharge member may comprise a chute which can be tilted with the medicine put thereon so that the medicine will slide toward the collecting mechanism.

Alternatively, the discharge member may also comprise a conveyor which can be driven with the medicine thereon so that the medicine is conveyed toward the collecting mechanism.

The storage containers may be disposed at different positions in a vertical direction and the collecting mechanism can be ascended and descended to collect the medicines from each of the storage containers. This enables the storage containers to be highly integrated.

The apparatus may further comprises a detector for detecting the medicine discharged from the storage container, whereby the collecting mechanism is driven based on a detection signal of the detector to move the medicine on the collecting mechanism so that the medicine on the collecting mechanism does not obstruct the medicine discharged from the storage container. This enables the medicines to be smoothly discharged from the storage containers.

The present invention also provides a medicine feed apparatus comprising a plurality of storage containers for storing medicines which are stacked in a vertical direction. The necessary quantity of medicines are discharged one by one in accordance with a prescription data in order from the lowermost medicine. The apparatus comprises:

- a support member positioned at the lower part of the storage container, the support member being movable between a discharge preparation position where the support member positions the medicine at the lowermost point of the storage container and a discharge position where the lowermost medicine is laterally moved and the support member positions the second medicine at one-stage higher than the lowermost point; and
- a discharge member for discharging the medicine when the support member is moved to the discharge position along with the medicine.

According to the aforementioned construction of the present invention, reciprocating movement of the support member allows the lowermost medicine to be moved to the discharge position and causes the next medicine to be supported by the support member. Driving the discharge member enables the medicine, which has been moved to the discharge position to be discharged.

Preferably, the apparatus may further comprise:

- a detector for detecting the medicine discharged by the discharge member; and
- a notification unit for notifying a user of a shortage of medicine when the detector does not detect the medicine for a predetermined time after driving the support member and the discharge member.

At the initial operation of the support member and the discharge member, the discharge member may be reversed for a predetermined time so that the medicine which remains on the discharge member is stopped at a predetermined position. This surely prevents the medicine remaining on the discharge member from being discharged.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Figure 1:
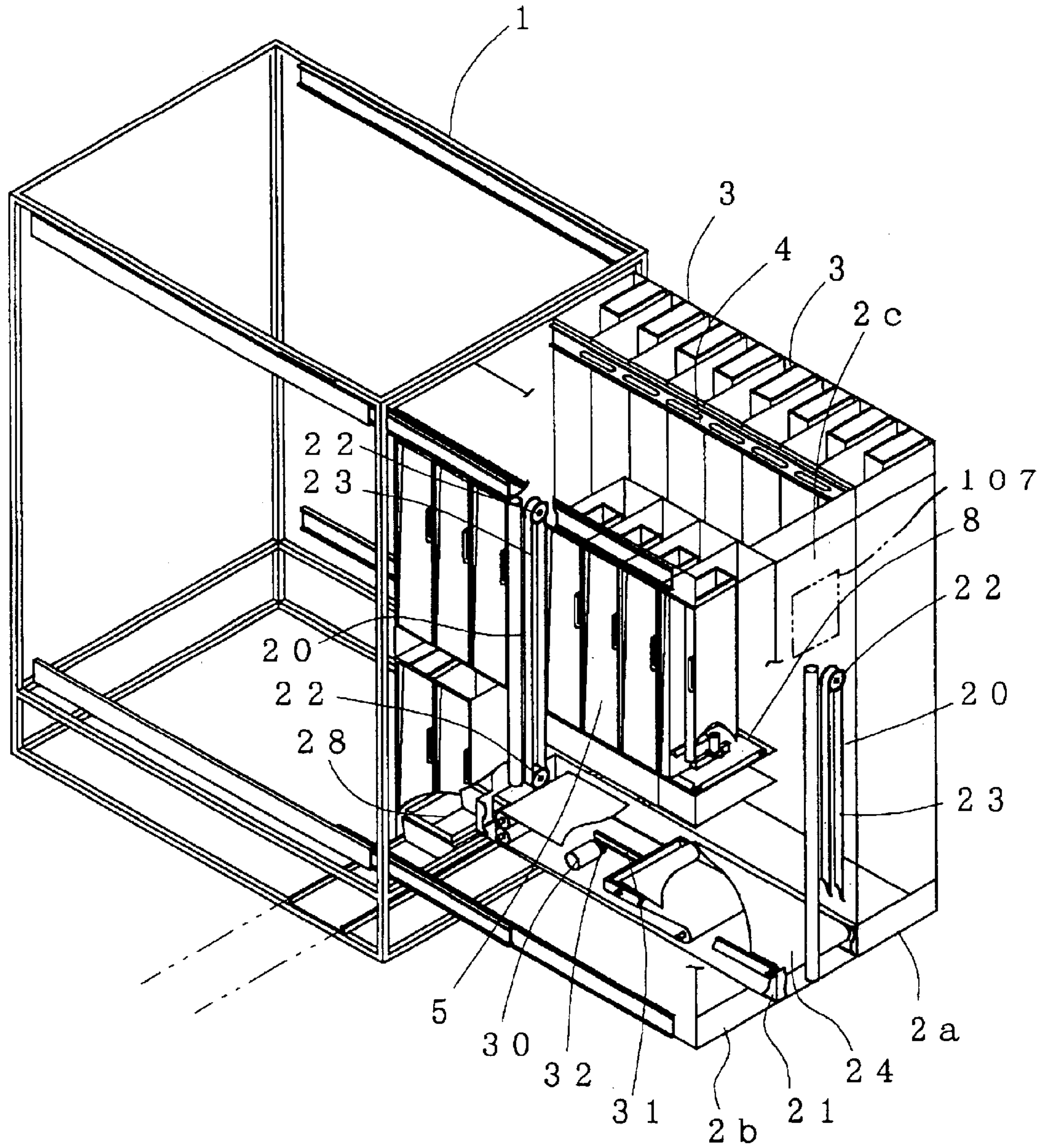
FIG. 1 is a perspective view of a medicine feed apparatus according to an embodiment of the present invention.

FIG. 1 shows a medicine feed apparatus according to an embodiment of the present invention. Inside a body frame 1 of the medicine feed apparatus, three drawers 2*a*, 2*b* and 2*c* are contained.

Figure 2:
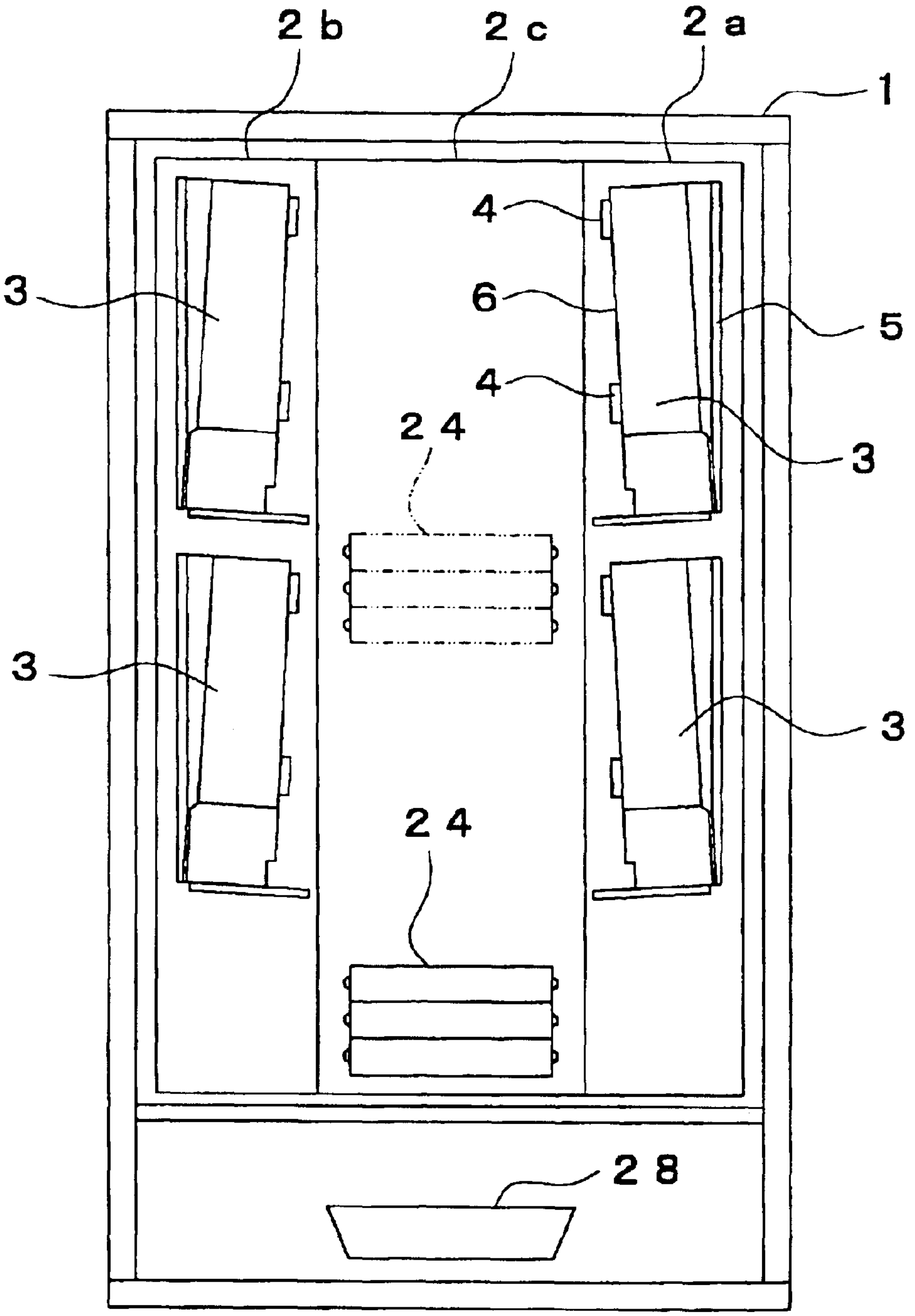
FIG. 2 is a front view of the medicine feed apparatus of FIG. 1.

On the upper and lower stages of each of the drawers 2*a*, 2*b* positioned on both sides, as shown in FIG. 2, a plurality of storage containers 3 are attached with the rear wall thereof screwed on two horizontal beams 4. Screwing is performed by inserting bolts into slits (not shown) formed in the horizontal beams 4 along a longitudinal direction. Thus, the storage container 3 can be attached in a desired position. An attaching space is not restricted even for the storage container 3 having a different width. Therefore, in any medical institutes treating a different kind of and a different quantity of medicines, the medicine feed apparatus of the present invention can be used by selecting the kinds of storage containers 3 to be attached.

Figure 3:
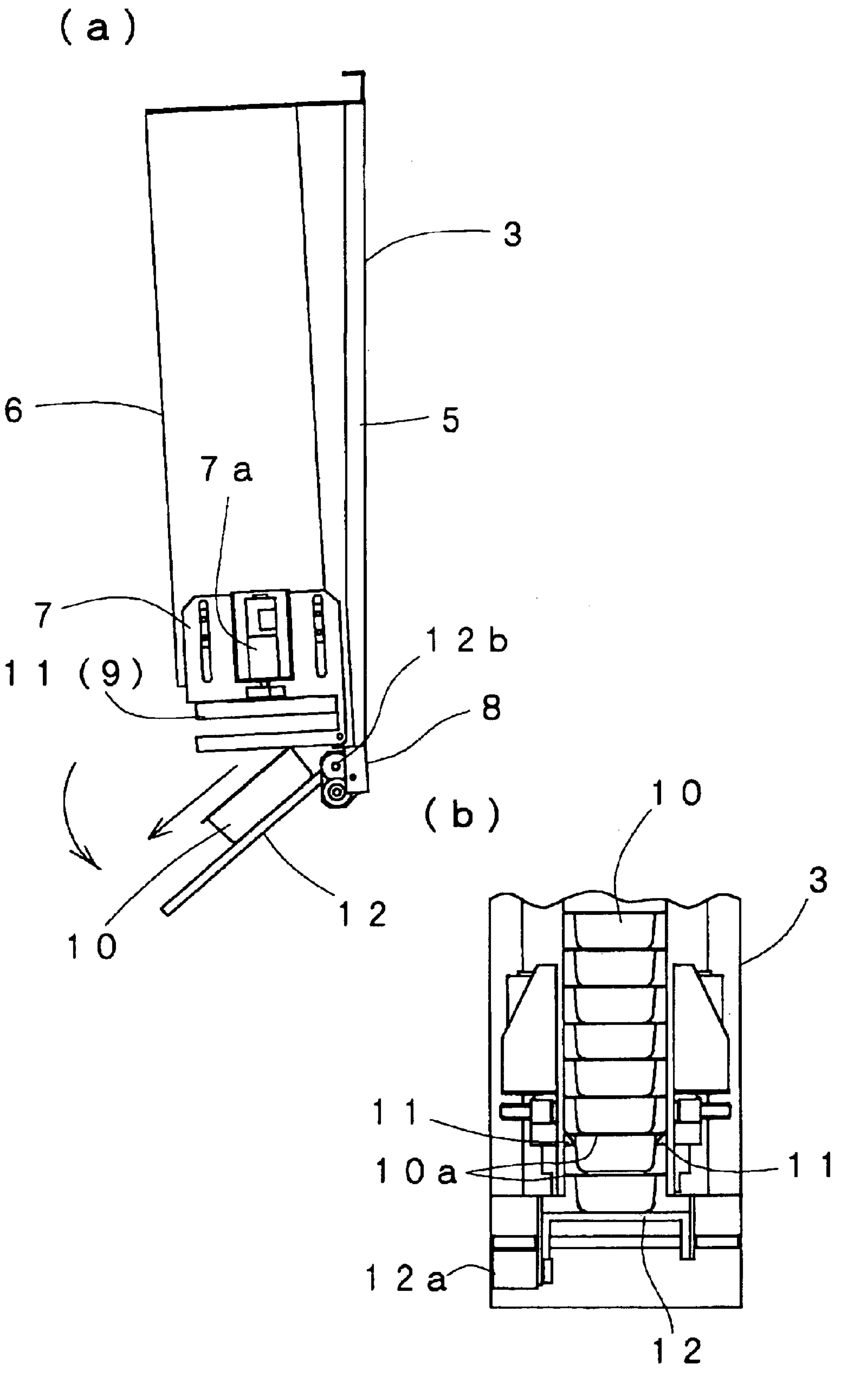
FIG. 3(*a*) is a side view of an example of a storage container of the medicine feed apparatus of FIG. 1 and FIG. 3(*b*) is a partial front view of the storage container of FIG. 3(*a*) with the door opened.
Figure 4:
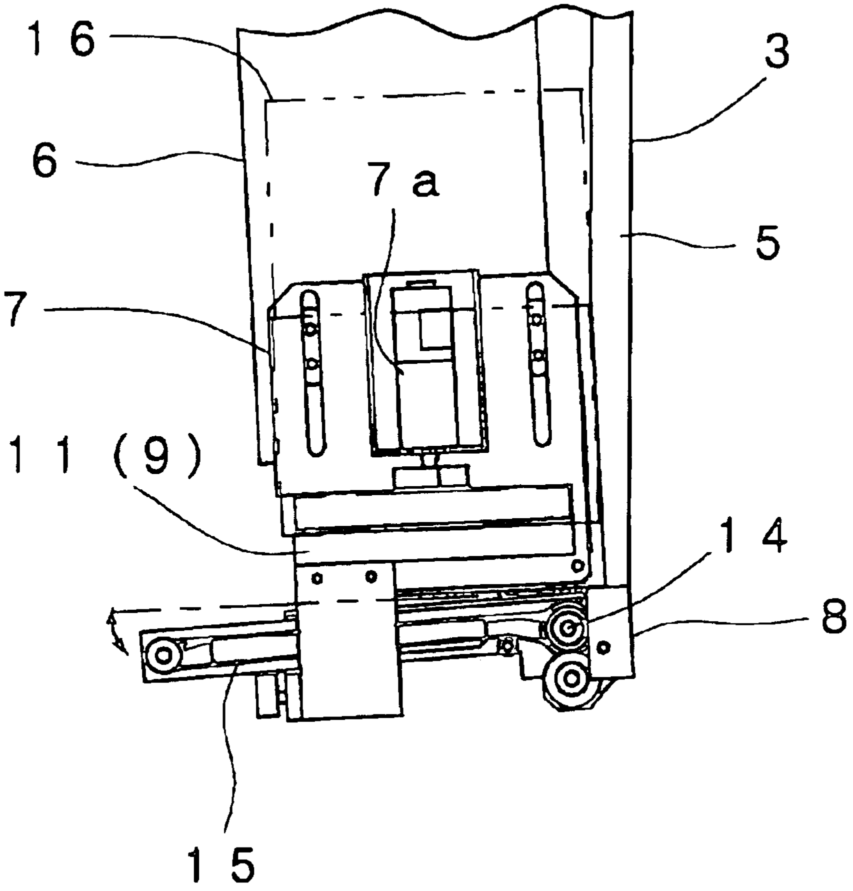
FIG. 4 is a partial side view of an example of a storage container of the medicine feed apparatus of FIG. 1.
Figure 5:
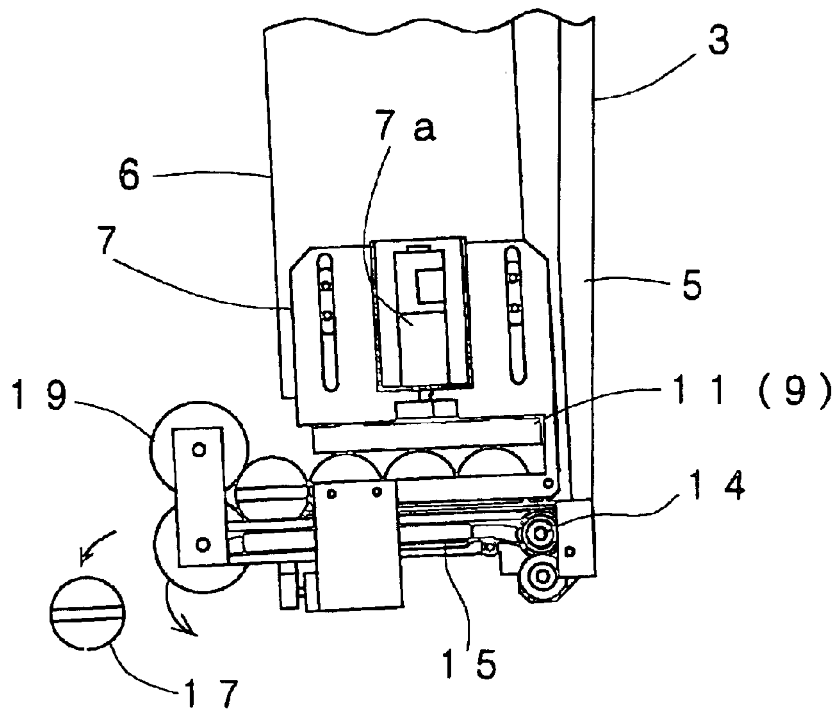
FIG. 5(*a*) is a partial side view of an example of a storage container of the medicine feed apparatus of FIG. 1 and FIG. 5(*b*) is a partial perspective view of FIG. 5(*a*)
Figure 5:
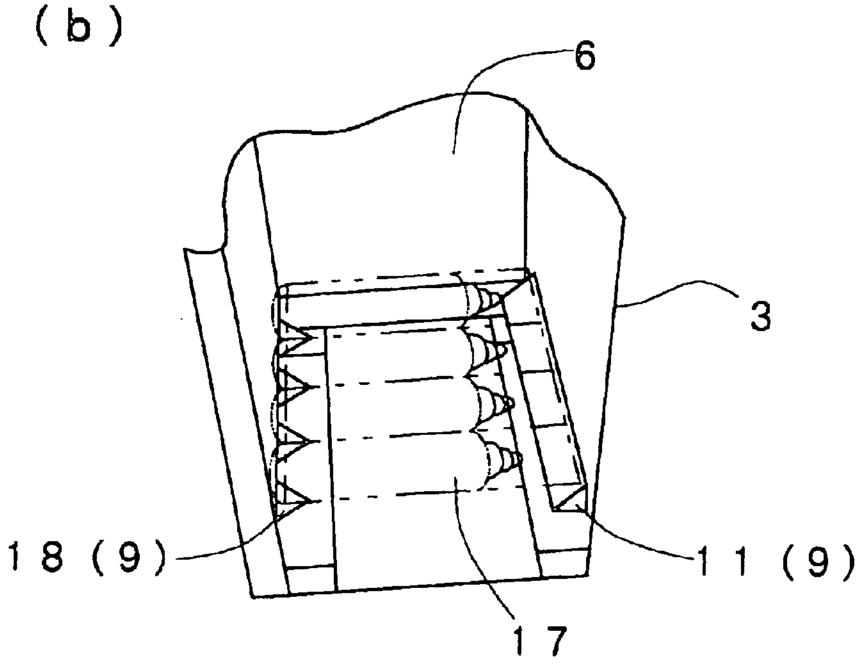

Three kinds of the storage containers 3 containing different kinds of medicines are provided as shown in FIGS. 3 to 5. Each storage container 3 has a door 5 in the front surface thereof and has a structure which makes it possible to stack the medicines in a vertical direction. The back side surface of the storage container 3 is tilted toward the back thereof. Thus, the stacked medicines are leaned backward, preventing the medicines from falling or being dropped off when the door 5 is opened. In the lower part of the storage container 3, a retaining mechanism 7 and a discharge mechanism 8 are provided. The retaining mechanism 7 is so constructed that retaining portions 9 are protruded from and retracted into the opposite side surfaces by driving a motor 7*a*. The discharge mechanism 8 is disposed at the bottom of the storage container 3 and so constructed that the lowermost medicine package can be discharge in a lateral direction. The medicine to be discharged by the discharged mechanism 8 is detected by a sensor (not shown).

Figure 6:
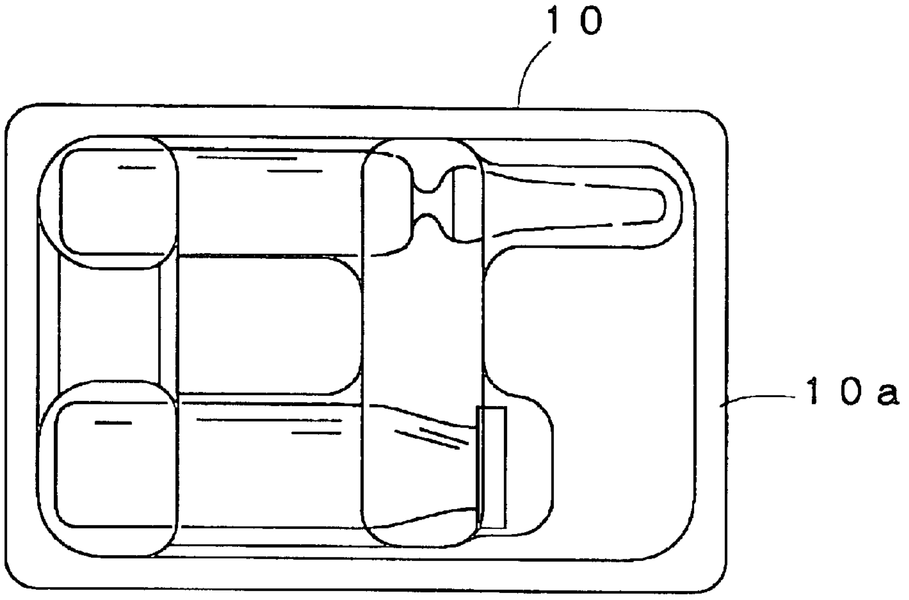
FIG. 6 is a plan view of an example of a medicine package stored in the storage container of FIG. 3.

The storage container 3, as shown in FIG. 3, is suitable for discharging a blister pack 10 as shown in FIG. 6. The retaining portion 9 of the retaining mechanism 7 comprises protrusions 11 which protrude between the sheet stuck surfaces 11*a* of the lowermost and second stacked blister packs 10 to support the second blister pack 10 with the upper blister packs 10 stacked thereon. The discharge mechanism 8 comprises a chute 12 which can be tilted downward around a support shaft 12*b* by about 45 degrees by driving a motor 12*a*.

Figure 7:
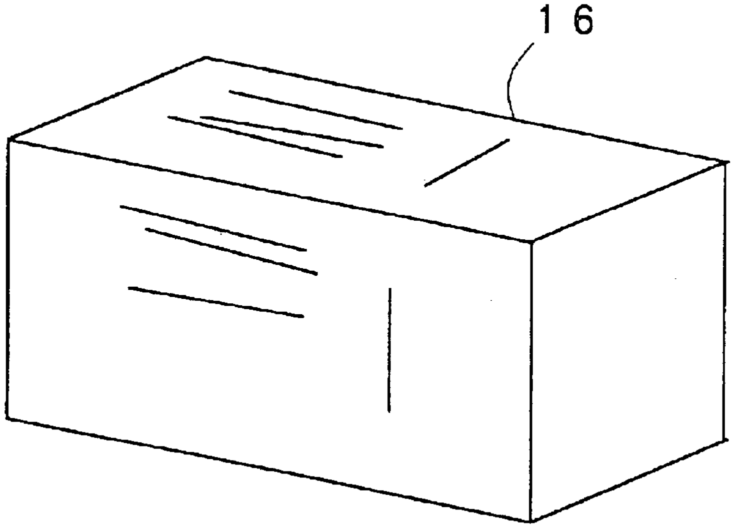
FIG. 7 is a perspective view of an example of a medicine package stored in the storage container of FIG. 4.

The storage container 3 as shown in FIG. 4 is suitable for discharging a boxed medicine as shown in FIG. 7. The retaining portion 9 of the retaining mechanism 7 comprises, in the same manner as that of FIG. 3, protrusions 11 which can support the both side portions of the bottom of the second medicine box 16 with the upper medicine boxes 16 stacked thereon. The discharge mechanism 8 comprises a conveyor belt 15 which can be tilted downward around a support shaft 14. The discharge mechanism 8 conveys the lowermost medicine box 16 via the conveyor belt 15 by a predetermined distance and standbys in a state in which the protrusions 11 hold the second and upper stacked medicine boxes 16.

Figure 8:
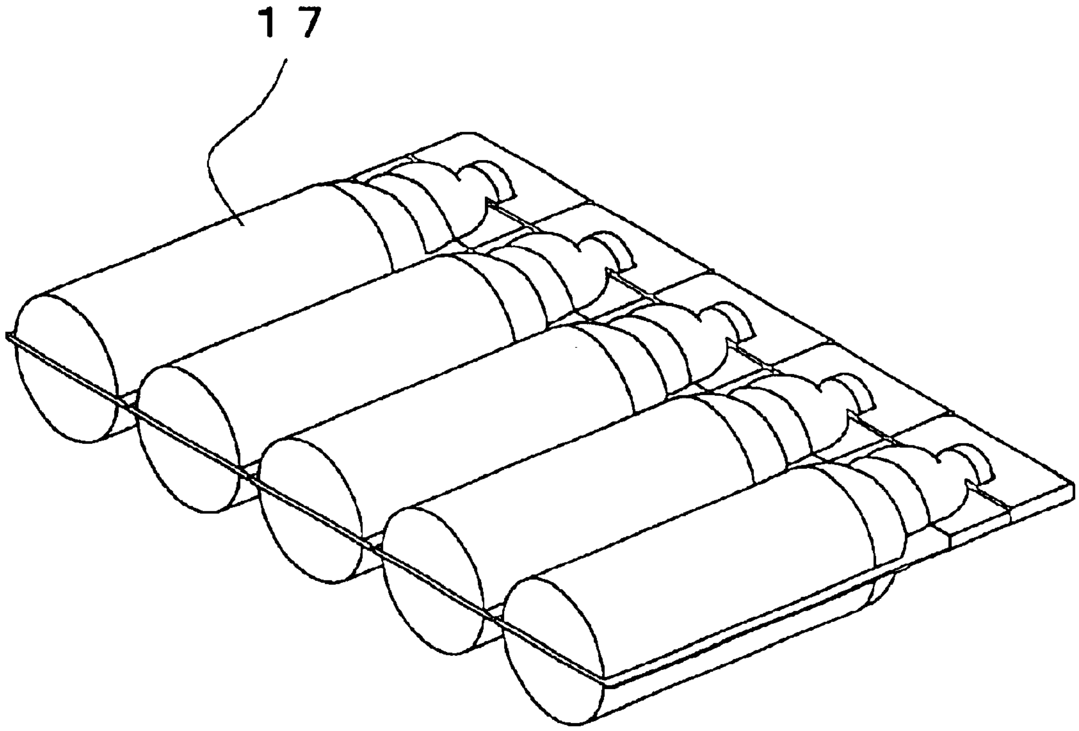
FIG. 8 is a perspective view of an example of a medicine package stored in the storage-container of FIG. 5.

The storage container 3 as shown in FIG. 5 is suitable for cutting respective ampoules from a set of multi-connected (five-connected in the example) plastic ampoules 17 as shown in FIG. 8 and discharging them. The retaining portion 9 of the retaining mechanism 7 comprises a plurality of claws 18 which are positioned between the respective ampoules and can support the bottom ends of the respective ampoules of the set of plastic ampoules 17 and a protrusion 11 which can support the top end of the set of the plastic ampoules 17. Thus, even the ampoules 17 that are already cut can be contained in the storage container 3. The discharge mechanism 8 comprises a conveyor belt 15 in the same manner as that of FIG. 4. On the tip end of the conveyor belt 15 is provided a cutting rotor 19 (refer to Japanese Patent Laid-open Publication No. H8-243146) as a means for cutting the respective ampoules of the set of plastic ampoules 17 one by one.

In the storage container 3 as shown in FIGS. 4 and 5, the conveyor belt 15 can actively discharge the medicine packages, reducing the tilt angle thereof. Therefore, a vertical space occupied by the storage container 3 becomes smaller. Thus, it is possible to dispose many storage containers 3 in a vertical direction, enabling a high accumulation of the storage containers 3. This effect is exerted especially in the storage container 3 containing the boxed medicines.

Figure 9:
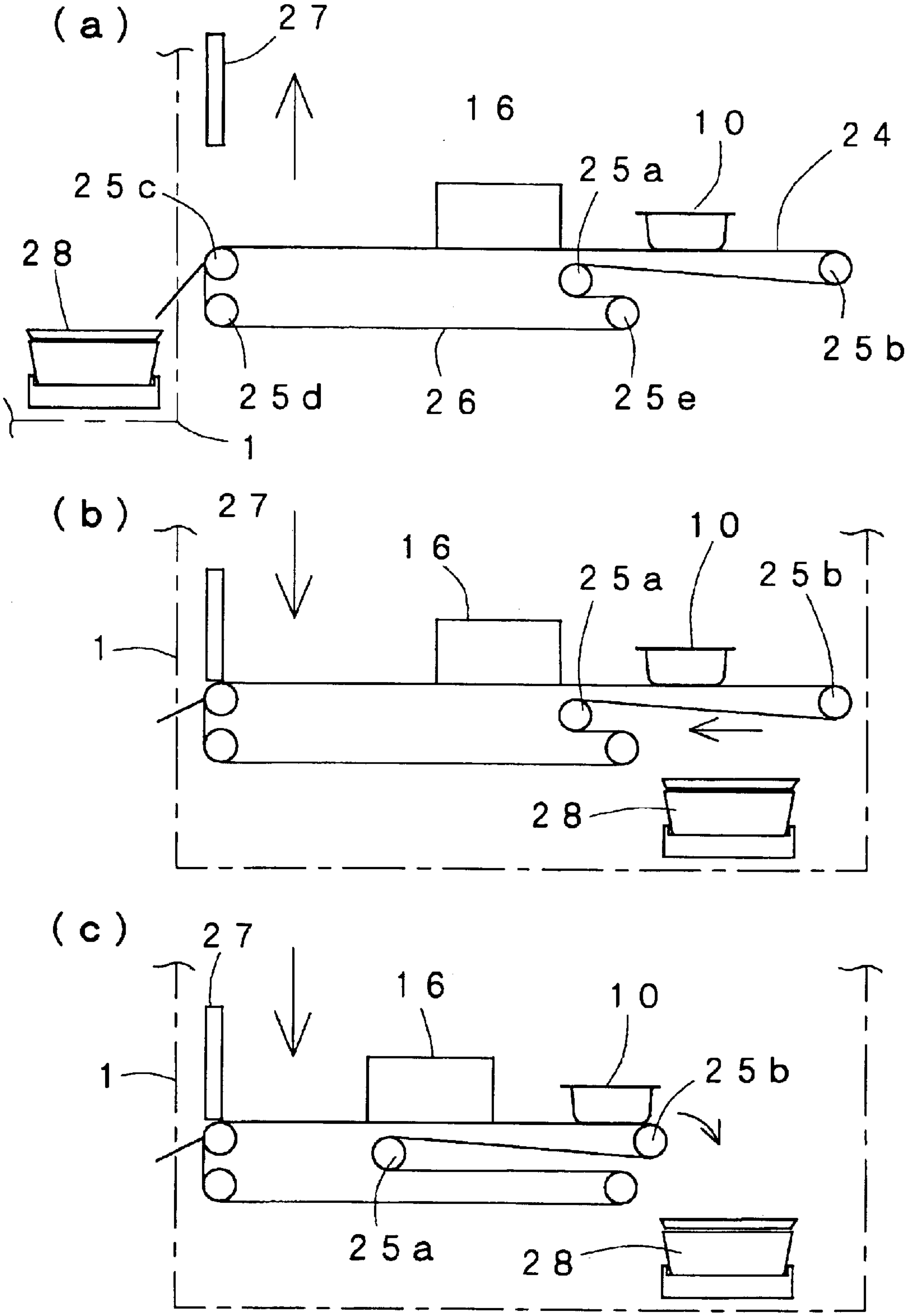
FIGS. 9(*a*) to 9(*c*) are schematic views showing an operation of the belt conveyor of the medicine feed apparatus of FIG. 1.

On the middle drawer 2*c*, a frame 21 which is ascended and descended by a lifter 20 is provided. The lifter 20 comprises timing belts 23 each of which moves on two rollers 22 disposed on the drawer 2*c* in a vertical direction. A portion of each of the timing belts 23 is fixed on the frame 21. The bottom of the frame 21 comprises a belt conveyor 24 as a collecting mechanism according to the present invention. The belt conveyor 24 comprises a belt 26 which can move on five pulleys 25*a*, 25*b*, 25*c*, 25*d* and 25*e* as shown in FIG. 9. Driving a motor not shown to rotate the pulley 25*d* forwardly or reversely causes the belt 26 to be circulated, allowing the medicine put on the belt 26 to be conveyed in back and forth directions. The pulleys 25*a* and 25*b* can be moved in back and forth directions by means of a rack 31 and a pinion 32 fixed on a rotation axis of a motor 30 so that the front end (referred to as a retractable end) of the belt 26 can be retracted or extended. Above the rear end of the belt 26, a shutter 27 which can be opened and closed in a vertical direction is disposed.

On the front side of the bottom of the body frame 1, there is provided a recovery box 28 which is positioned beneath the retractable end of the belt conveyor 24. The recovery box 28 is put on rails which are disposed so as to pass through the body frame 1.

The drawers 2*a*, 2*b* and 2*c* are normally integrated by a linkage member so that they are integrally drawn from and contained in the body frame 1. At the time of maintenance, the linkage member is disengaged, and only the central drawer 2*c* can be drawn from and contained in the body frame 1.

Operation of the aforementioned medicine feed apparatus will be explained.

Upon receiving a prescription data, the storage container 3 in which the medicines corresponding to the prescription data are contained is specified. Then, it is decided at which stage the storage container 3 is positioned, the upper stage or the lower stage. If the storage container 3 is positioned at the lower stage, then the belt conveyor 24 remains as it is. If the storage container 3 is positioned at the upper stage, then the lifter 20 is driven to ascend the belt conveyor 24. Subsequently, the discharge mechanism 8 is driven to discharge the lowermost medicine in the storage container. The discharged medicine is placed on the belt 26 of the belt conveyor 24. When the discharge of the medicine is detected by the sensor, the belt conveyor 24 is driven to shift the position where the medicine is discharged. Therefore, the medicine corresponding to the next data is smoothly discharged without being obstructed by the medicine on the belt conveyor 26. The above mentioned operation is repeated until the number of medicines reaches the predetermined number specified by the prescription data.

When the predetermined number of medicines have been discharged onto the belt conveyor 24, if the belt conveyor 24 is positioned at the lower stage, then the belt conveyor 24 remains as it is, while if the belt conveyor 24 is positioned at the upper stage, then the belt conveyor 24 is lowered. Subsequently, as shown in FIG. 9(*b*), the belt conveyor 24 is driven in a forward direction and the pulleys 25*a* and 25*b* are moved so that the retractable end of the belt conveyor 24 is retracted. Thus, as shown in FIG. 9(*b*), the recovery box 28 is revealed so that the first passage is formed. The medicines on the belt 26 are recovered through the retractable end into the recovery box 28 one after another. When all of the medicines on the belt 26 have been recovered into the recovery box 28, the pulleys 25*a* and 25*b* are returned to the original position and the operation of the belt conveyor 24 is stopped. The recovery box 28 is moved on the rails and conveyed to a feed place to feed the medicines.

In a case where any of medicines become depleted, the drawers 2*a*, 2*b* and 2*c* are drawn from the frame body 1. Then, the door 5 of the depleted storage container 3 is opened in order to replenish it with the medicines. In this case, as shown in FIG. 9(*a*), the recovery box 28 is positioned at an another end of the belt conveyor 24 opposite to the retractable end so that a second passage is formed. Therefore, even during the replenishing work, the medicines can be discharged onto the belt conveyor 24 from the storage container 3 based on the prescription data. Then, the belt conveyor 24 is driven in a reverse direction and shutter 27 is opened so that the medicines are recovered in the recovery box 28 through the opposite end relative to the retractable end. If drawing of the drawers 2*a*, 2*b* and 2*c* are carried out during the conveyance of the medicines on the belt conveyor 24, the operation of the belt conveyor 24 is stopped. Then, the belt conveyor 24 is driven again after the drawers 2*a*, 2*b* and 2*c* have been completely drawn from the body frame 1.

Thus, according to the construction of the belt conveyor 24, even when the drawers 2*a*, 2*b* and 2*c* are pulled out, the medicines on the belt 26 can be recovered in the recovery box 28, thereby enhancing the work efficiency.

The construction of the storage container 3 adopted in the medicine feed apparatus may be applied to a medicine dispenser apparatus such as a medicine packing apparatus, an ampoule containing and feeding apparatus, a transfusion bottle feeding apparatus and so on.

Figure 10:
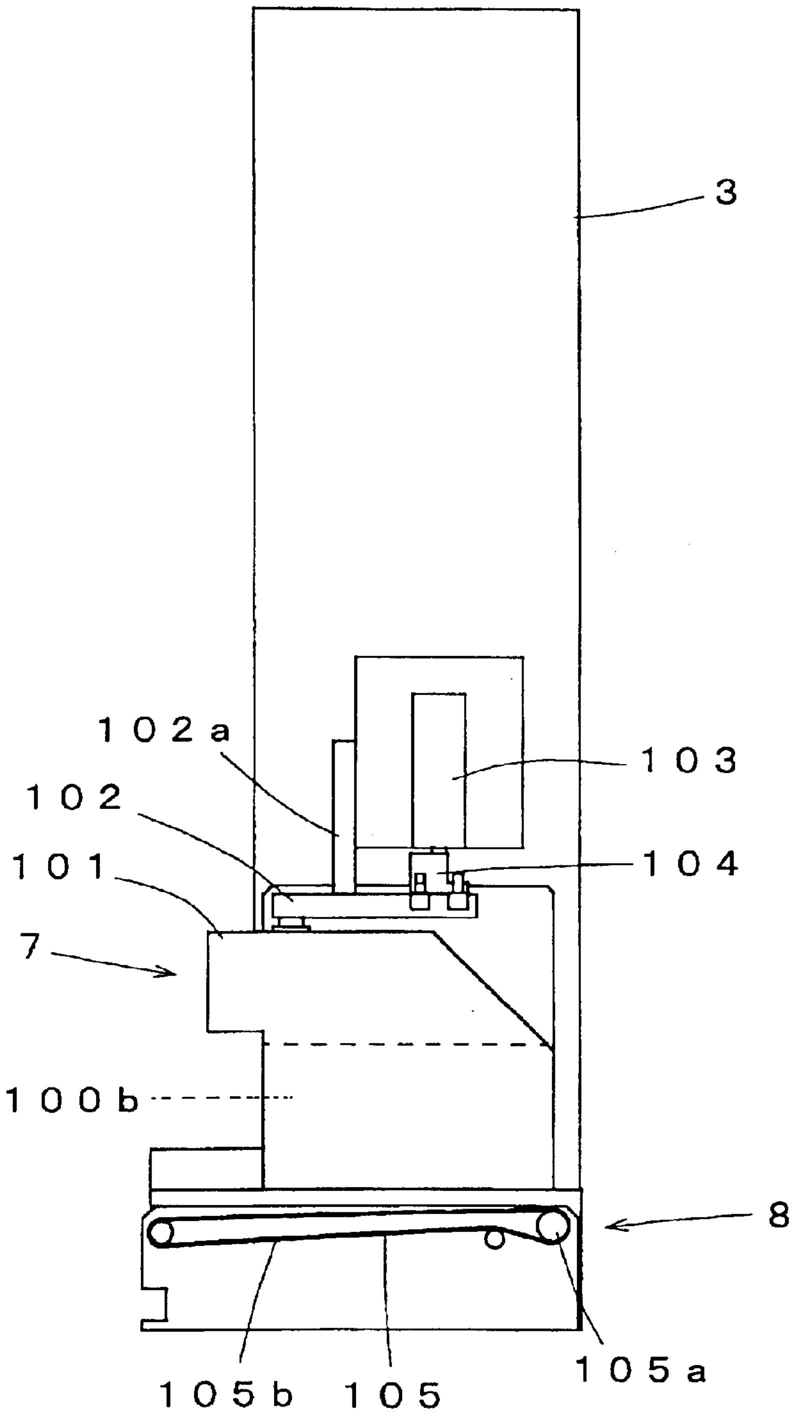
FIG. 10 is a side view of a storage container having an another example of a retaining mechanism and a discharge mechanism.

The retaining mechanism 7 and the discharge mechanism 8 may be constructed as shown in FIG. 10. The retaining mechanism 7 comprises a pair of guide plates 100*a*, 100*b* which constitutes the lower opposite walls of the storage container 3 and a support plate 100*c* positioned beneath the lower end of the guide plate 100*a* (refer to FIG. 11). The guide plates 100*a*, 100*b* are connected with each other by means of a connection portion 101 in order to maintain a predetermined distance or spacing. To the connecting portion 101 is connected one end of an arm 102. The arm 102 is pivoted on an axis 102*a*. The other end of the arm 102 comes into contact with a cam 104 fixed on a rotation axis of a motor 103. Thus, the pair of the guide plates 100*a*, 100*b* can be reciprocated between a discharge preparation position P1 and a discharge position P2 by the rotation of the motor 103. The support plate 100*c* can support the bottom edge of the lowermost medicine box 16 when the guide plates 100*a*, 100*b* are positioned at the discharge position P2. As the discharge mechanism 8, a known belt conveyor 105 is used. The belt conveyor 105 comprises a belt 105*b* which can be moved on two pulleys 105*a* by driving a motor (not shown) to rotate the pulley 105*a*. Other than the belt conveyor 105, another means, such as a chute and so on, can be used as the discharge mechanism 8.

Operation of the retaining mechanism 7 and the discharge mechanism 8 will be explained hereinafter.

When receiving a prescription data, the belt conveyor 105 is reversed for a predetermined time as an initial operation. This prevents the medicine box 16, which is on the belt conveyor 105, from being discharged. At this time the medicine box 16 is stopped at a predetermined position by a stopper (not shown). Then, the belt conveyor 105 is driven forward and the discharge condition of the medicine box 16 is detected by a sensor 106 (refer to FIG. 11(*d*)). When the sensor 106 does not detect the medicine box 16 even if the belt conveyor 105 is driven forward for a predetermined time, the motor 103 is driven to reciprocate the guide plate 10*a*, 100*b* in order to start the discharge operation of the medicine box 16 which will be explained hereinafter in accordance with the received prescription data.

Figure 11:
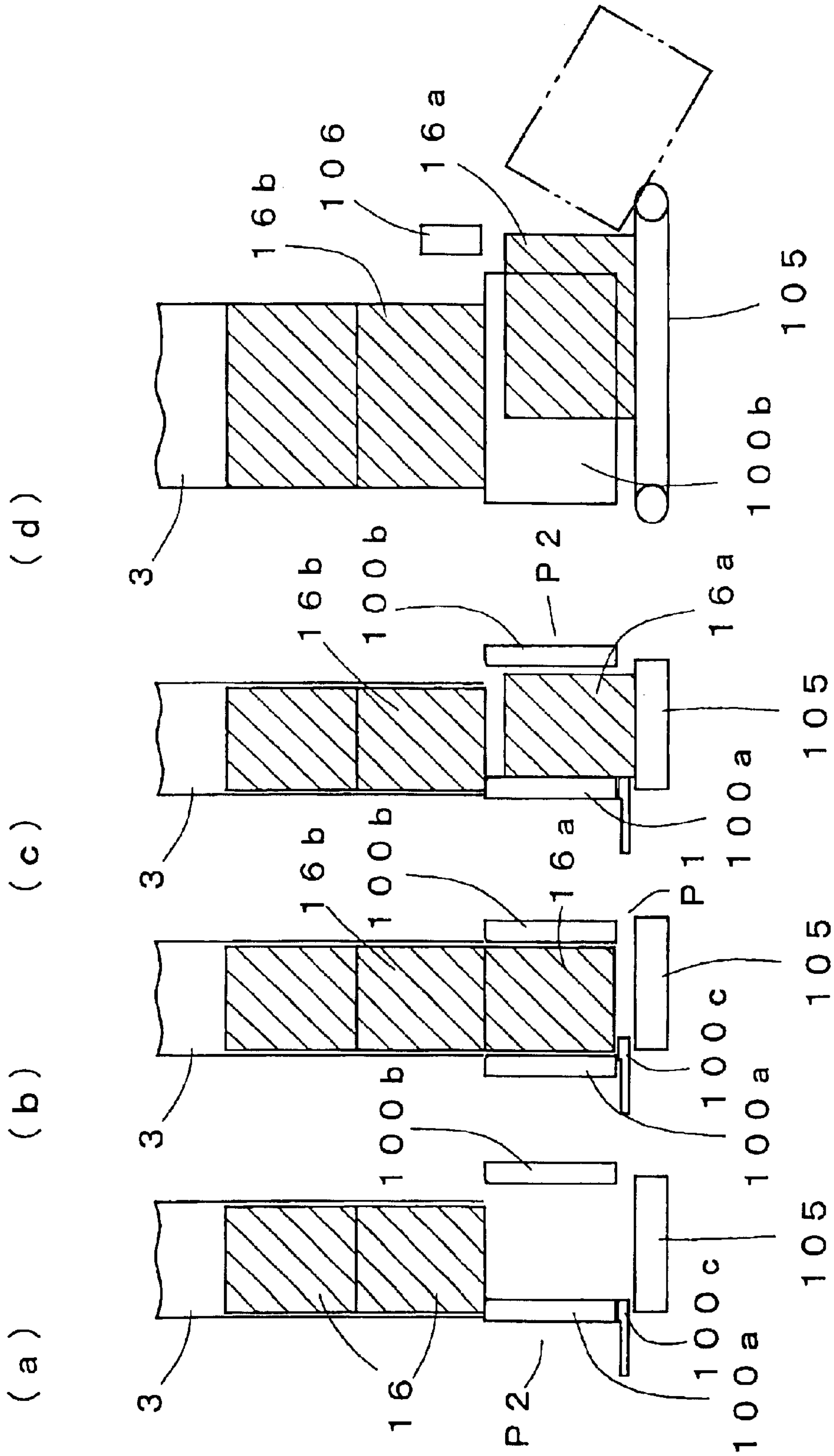
FIGS. 11(*a*) to 11(*d*) are schematic views showing a state of discharging medicine boxes by the retaining mechanism and the discharge mechanism of FIG. 10.

The guide plates 100*a*, 100*b* are moved from the discharge position P2 as shown in FIG. 11(*a*) to the discharge preparation position P1 as shown in FIG. 11(*b*) first. Thus, the medicine boxes 16 in the storage container 3 descend so that the lowermost medicine box 16*a* is supported by the support plate 100*c* and positioned at the discharge preparation position P1. When the guide plates 100*a*, 100*b* are moved to the discharge position P2 as shown in FIG. 11(*c*), the medicine box 16*a* is moved to the discharge position P1 and placed on the belt conveyor 105. The next medicine box 16*b* is supported on the upper end of the guide plate 100*a*. Then, the belt conveyor 105 is driven to discharge the medicine box 16*a*.

After this, the guide plates 100*a*, 100*b* are reciprocated in the same manner as explained above to discharge the medicine box 16 one after another. If the sensor 106 does not detect the medicine box 16 during the discharge operation, the reverse and forward operations of the belt conveyor 105 are repeated. Thus, even if the medicine box 16 during the discharge operation is jammed, it is automatically settled if it is simple. In a case where the jam can not be settled or where the storage container becomes depleted, it may be noticed on a display 107 as shown in FIG. 1.

Although the present invention has been fully described by way of the examples with reference to the accompanying drawings, it is to be noted that various changes and modifications will be apparent to those skilled in the art. Therefore, unless such changes and modifications otherwise depart from the spirit and scope of the present invention, they should be construed as being included therein.

What is claimed is:

1. A medicine feed apparatus comprising:

at least one storage container for storing packages of medicine which are stacked in a vertical direction, the necessary quantity of medicine being discharged by dispensing the packages one by one in accordance with a prescription data in order from a bottom of the storage container;

a support assembly positioned at a lower part of the storage container, the support assembly being operable to support the medicine packages above the lowermost medicine package and permit only the lowermost package to fall under its own weight;

a discharge member for receiving and discharging the lowermost medicine package from the support assembly; and a collecting mechanism for receiving the medicine package from the discharge member and conveying the medicine package to a predetermined position, wherein the support assembly includes a pair of spaced guide plates and a support plate positioned below one of the guide plates.

2. A medicine feed apparatus as claimed in claim 1, further comprising a detector for detecting a medicine package that has been discharged by the discharge member.

3. A medicine feed apparatus as claimed in claim 1, wherein the discharge member comprises a belt conveyor that can be selectively driven in a forward direction and a rearward direction.

4. A medicine feed apparatus as claimed in claim 1, further comprising a plurality of storage containers.

5. A medicine feed apparatus as claimed in claim 1, wherein said at least one storage container is positioned such that a longitudinal axis of the storage container is tilted relative to a vertical direction and a discharge direction is tilted downward.

6. A medicine feed apparatus as claimed in claim 1, wherein the guide plates are connected to each other so as to maintain a predetermined spacing.

7. A medicine feed apparatus as claimed in claim 6, further comprising a drive device for moving the guide plates relative to the storage container.

8. A medicine feed apparatus as claimed in claim 6, further comprising a drive device for reciprocating the guide plates relative to the support plate in order to permit the lowermost medicine package to be separated from the stack of medicine packages and fall from the storage container onto the discharge member.

9. A medicine feed apparatus comprising:

at least one storage container for storing packages of medicine which are stacked in a vertical direction, the necessary quantity of medicine being discharged by dispensing the packages one by one in accordance with a prescription data in order from a bottom of the storage container;

a discharge member for discharging the medicine packages;

a support assembly positioned at a lower part of the storage container, the support assembly being operable to support the medicine packages above the lowermost medicine package and permit only the lowermost package to fall under its own weight onto the discharge member; and a collecting mechanism for receiving the medicine package from the discharge member and conveying the medicine package to a predetermined position, wherein the support assembly is movable between a discharge preparation position wherein the support assembly positions the medicine at a lowermost point of the storage container, and a discharge position wherein the lowermost medicine is laterally moved with respect to the discharge member, and simultaneously, the support assembly positions the second lowermost medicine at a location that is one-stage higher than the lowermost point; and wherein the discharge member is operable to discharge the medicine when the support assembly is moved to the discharge position along with the medicine.

10. A medicine feed apparatus as in claim 9, further comprising:

a detector for detecting the medicine discharged by the discharge member; and a notification unit for notifying a user of a shortage of medicine when the detector does not detect the medicine for a predetermined time after driving the support assembly and the discharge member.

11. A medicine feed apparatus as in claim 9, wherein the discharge member comprises a conveyor, and at an initial operation of the support assembly and the conveyor, the conveyor is driven in a reverse direction for a predetermined time so that the medicine, which remains on the discharge member, is stopped at a predetermined position.

* * * * *